Figure 1:
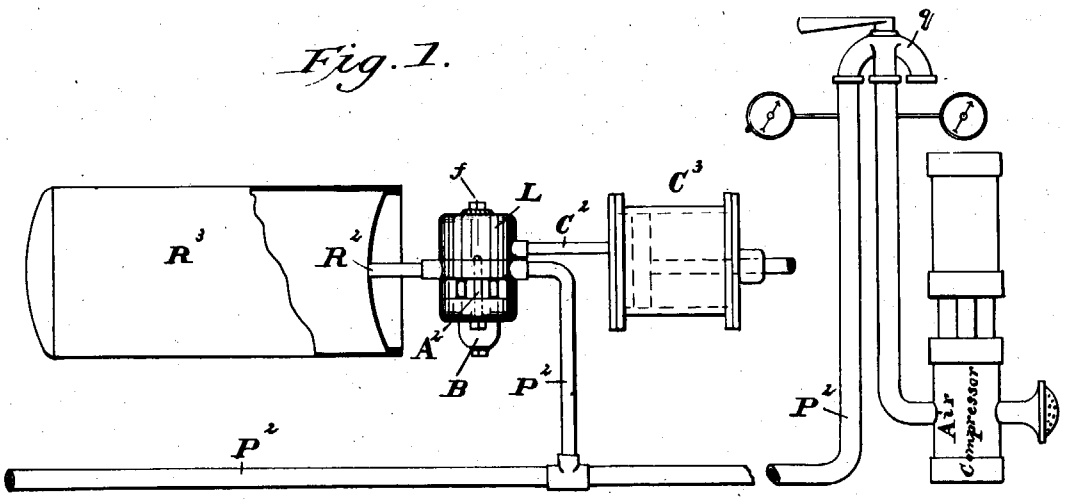

3 Sheets—Sheet 1.

G. A. BOYDEN.

Assignor of one-half to C. B. MANN.

FLUID PRESSURE BRAKE.

No. 10,993. Reissued Apr. 2, 1889.

WITNESSES:

Ed. A. Newman,
Al. C. Newman,

INVENTOR:

George A. Boyden
By his Attorneys
Baldwin Hopkins & Peyton

G. A. BOYDEN.

Assignor of one-half to C. B. MANN.

FLUID PRESSURE BRAKE.

No. 10,993. Reissued Apr. 2, 1889.

WITNESSES:

Ed. A. Newman,
Al. C. Newman,

INVENTOR:

George A. Boyden,
By his Attorneys
Baldwin Hopkins & Peyton

G. A. BOYDEN.

Assignor of one-half to C. B. MANN.

FLUID PRESSURE BRAKE.

No. 10,993. Reissued Apr. 2, 1889.

WITNESSES:

Ed. A. Newman,
Al. C. Newman,

INVENTOR:

George A. Boyden,
By his Attorneys
Baldwin Hopkins & Peyton

UNITED STATES PATENT OFFICE.

GEORGE A. BOYDEN, OF BALTIMORE, MARYLAND, ASSIGNOR OF ONE-HALF TO CHARLES B. MANN, OF SAME PLACE.

FLUID-PRESSURE BRAKE.

SPECIFICATION forming part of Reissued Letters Patent No. 10,993, dated April 2, 1889.

Original No. 280,285, dated June 26, 1883. Application for reissue filed January 11, 1888. Ser. No. 260,436.

*To all whom it may concern:*

Be it known that I, GEORGE A. BOYDEN, a citizen of the United States, residing at the city of Baltimore, in the State of Maryland, have invented certain new and useful Improvements in Fluid-Pressure Brakes, of which the following is a specification, reference being had therein to the accompanying drawings.

My invention relates to certain improvements in fluid-pressure brakes for railway-trains.

The objects of the invention are, first, to provide for replenishing, while the brake is on, the air-reservoir on each car or the brake-cylinder when the pressure therein has been lessened by leakage, and to accomplish this through a single line of train-pipe and by means which shall at all times be wholly under the control of the engineer, and also to provide for the more rapid charging than heretofore of the air-reservoir on the car, and also to obviate the necessity of applying the brakes with such a high pressure as heretofore has been necessary with the automatic brake, the effect of which is to slide the wheels and flatten them; second, to provide for dispensing with the main air-reservoir on or near the locomotive, and thereby simplify and cheapen the apparatus; third, to provide for the quicker release of the brake.

My invention consists, first, in the several combinations, hereinafter specified, with a brake-cylinder and an air-reservoir on the car, of means whereby the said brake-cylinder and air-reservoir may be replenished or recharged with compressed air while the passages or ports leading from the reservoir to the brake-cylinder are open and while the brakes are applied; second, in the combination, with an air-reservoir on the car and air-compressing apparatus on the locomotive, of means whereby are afforded the principal advantages of the "automatic" brake system, as well as the direct compressed-air system, without employing the usual main air-reservoir on or near the locomotive; third, in the combination of the brake-applying devices on the car, the valve mechanism which opens and closes communication with the brake-applying devices, and a valve to quicken the movement of said valve mechanism, whereby, when the train-pipe contains the maximum fluid-pressure, the brakes will be released quickly, it being understood that all the parts and combinations referred to are operated through a single line of train-pipe, as hereinafter specified.

Figure 2:
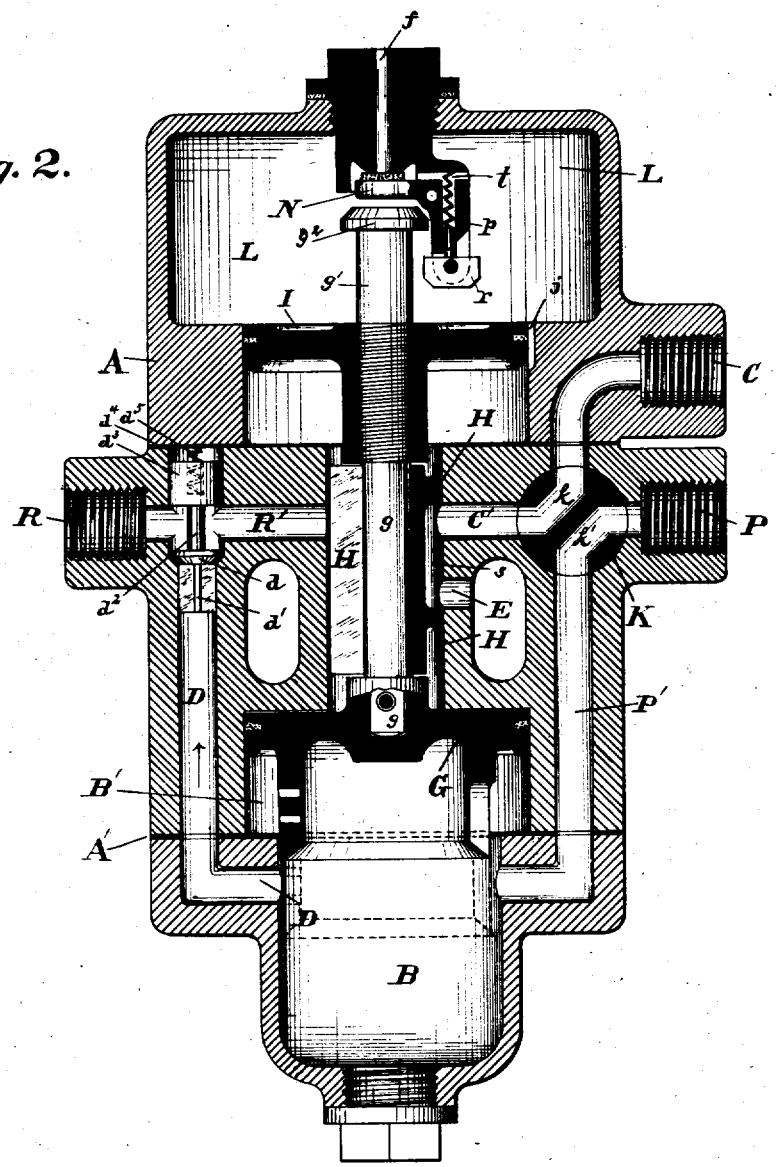
Figure 3:
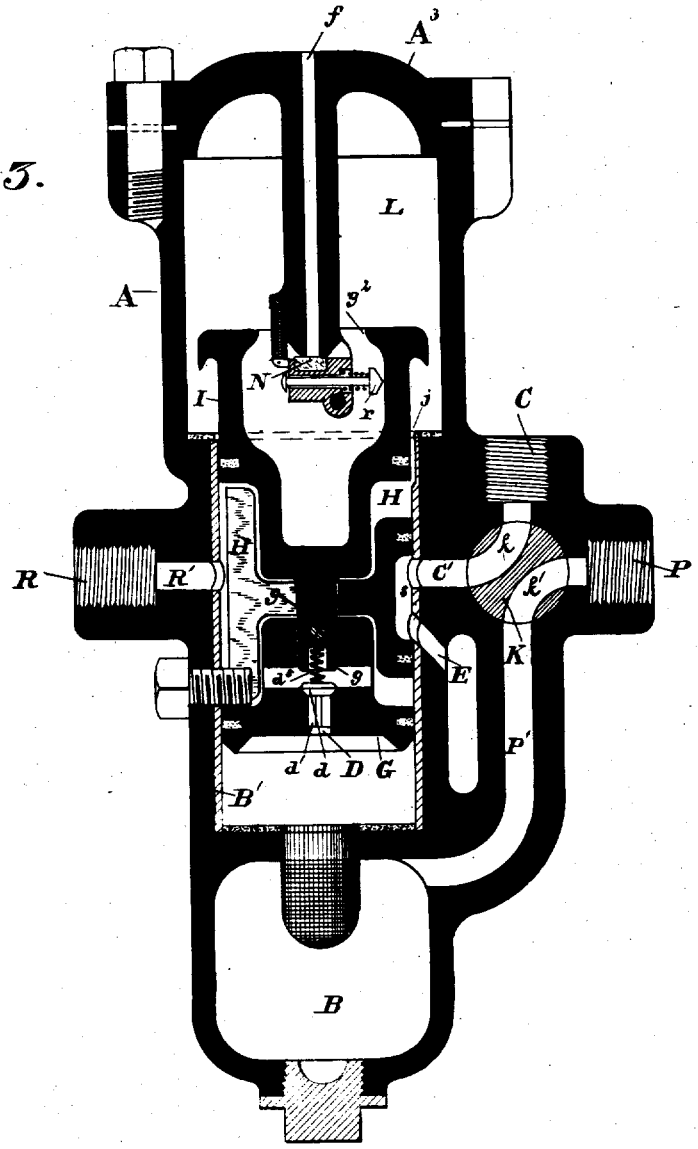

Figure 1 is a view of the parts properly assembled of a brake apparatus embodying my invention. Fig. 2 is a sectional view showing one plan of constructing the valve mechanism, the passage D, the valve which quickens the movement of said valve mechanism, and the air-chamber. Fig. 3 is a sectional view showing another plan of constructing the same parts.

The letter A designates the case of the valve, B the drip-chamber attached at the bottom, (see Fig. 2,) and A′ packing interposed between these parts, which are united by bolts $A^2$. (See Fig. 1.)

At the port P the train-pipe $P^2$ is attached. From this port a passage, P′, leads to the drip-chamber B. Adjoining this chamber is a cylinder, B′, fitted with a piston, G, which connects with a slide-valve, H, by means of a stem or rod, *g*. Instead of a slide-valve an ordinary three-way cock may be used. The slide-valve H has a cavity, *s*, long enough to uncover the passage C′ and the exhaust-port E and put them in communication. The passage C′ has an outlet at the port C, from which the pipe $C^2$ connects with the brake-cylinder $C^3$.

At the port R is connected the pipe $R^2$, which leads to the air-reservoir $R^3$ on the car. R′ is a passage direct from this port to the valve-chamber.

A four-way cock, K, with ports *k k′*, is arranged in line of the fluid-pressure communication to provide for operating the brakes of the car by either the automatic system or the direct compressed-air system, according as the train of which the car forms part may happen to be fitted out.

The four-way cock K is the same as heretofore used in air-brakes, but is not the means herein referred to by which the advantages of the said two systems of brakes are obtained.

The slide-valve H is the brake-applying and brake-releasing valve, and is the one referred to as opening and closing communication with the brake-applying devices, which consist of the brake-cylinder $C^3$ and its connections with the brake-shoes.

The construction of the parts thus far described may vary or be changed in many ways without materially affecting the operation or result of my improvements, which I will now proceed to describe.

Extending from the drip-chamber is a passage, D, provided with a check-valve, *d*, adapted to allow compressed air from the train-pipe $P^2$ to reach the air-reservoir and brake-cylinder on the car, but preventing its return therefrom, whereby no loss of fluid-pressure from reservoir $R^3$ or brake-cylinder can occur in case of accidental separation of the car from the train, and serving also, as hereinafter explained, to allow compressed air from the train-pipe to reach the brake-cylinder $C^3$ while the brake is applied. As the fluid-pressure can take but one direction in this passage, I call it "an open one-way passage." A passage substantially like this, open for fluid-pressure to reach the air-reservoir and brake-cylinder on the car, in connection with a valve moved both ways by air-pressure to open and close communication between the said air-reservoir and brake-cylinder, constitutes one feature of my invention.

The check-valve *d* may be constructed in any suitable manner. In the present case it has crossed wings *d'*, which fit in the passage and adapt it to slide like a piston, so that the valve may leave its seat. In Fig. 2 a shank or rod, $d^3$, projects from the valve and has attached a head, $d^2$, which fits in a cylinder or a bore, $d^4$. A spiral spring, $d^5$, bears on the head in such manner as to keep the check-valve normally to its seat. At the other end of the piston stem or rod *g* and connected thereto is a second piston, I, fitting and arranged to move in a cylinder provided with a port, *j*, adapted to be closed when the piston is in one position and to be opened when the piston is in another. This port connects with an air-chamber, L, which constitutes a feature of my invention. The air-chamber L may be constructed without any opening, port, or valve whatever other than the one *j*, which is opened and closed by the piston I. This air-chamber is employed to receive compressed air transmitted through the train-pipe at the maximum pressure. When the brakes are off, the piston I is in the position shown, and the fluid-pressure in the air-chamber, which is on the outer side of the piston, is the same as the pressure on the inner side of the piston; but when the fluid-pressure in the train-pipe $P^2$ is reduced such reduction of course is felt on the inner side of the piston, and thereupon the maximum pressure existing in the air-chamber presses the piston I back, and through the stem *g* shifts the slide-valve H, closing the exhaust-port E and opening direct communication between the air-passage R' and the brake-cylinder passage C', thereby applying the brakes. It will thus be seen the first effect produced by the fluid-pressure in the air-chamber is to shift the valve H, which applies the brakes. Heretofore in the Westinghouse brake the shifting of the valve has been effected wholly by the back action of the fluid-pressure in the auxiliary air-reservoir. Now, after a lessening of the fluid-pressure in the reservoir on the car or brake-cylinder by leakage has occurred, the maximum pressure in the chamber L has the further effect to act as an air-cushion to hold the valve H in the same position while the engineer manipulates the cock *q* on the locomotive to allow compressed air from the compressing apparatus to be transmitted through the open one-way passage D under a less pressure than the maximum, or less than that in the chamber L, to recharge and to continue charging the reservoir and brake-cylinder while the brakes are applied. This is a new and an important achievement through a single line of train-pipe, and enables me to dispense with the customary main air-reservoir on or near the locomotive. As long as the recharging is continued with the fluid under a less pressure than the maximum or less than that in the chamber L, there will be no relaxation of the grip of the brake-shoes on the wheels.

Instead of a piston, I, for the fluid-pressure in the air-chamber L to press against, a flexible or elastic diaphragm, with suitable valves, might be substituted. So far as concerns the air-chamber, of which the piston I is a part or necessary adjunct, I include as within my invention all known equivalents for the piston which will operate substantially as herein set forth.

It has been stated that the air-chamber may be constructed without other opening, port, or valve than that which is opened and closed by the piston I; but in the present instance a valve, N, is provided to quicken the movement of the valve mechanism which opens and closes communication with the brake-applying devices. This valve produces the said result by exhausting the air which is in immediate resistance to said valve mechanism, and constitutes another feature of my invention. This exhaust-valve consists, as shown in Fig. 2, of the escape-port *f*, a right-angled lever, *p*, one arm of which carries the valve N, which closes the escape-port, and the other arm of which carries a pivoted trigger, *r*. This arm is adapted to move laterally. When pressed down at one side, the trigger will yield, but when pressed upward on the same side it is unyielding. A spring, *t*, is arranged to keep the trigger normally in a given position. The piston-stem *g* has its upper end, *g'*, projecting past the piston I and into the air-chamber. A head, $g^3$, is on the projecting end.

From this description of the drawings it will now be understood that when, on applying the brakes, the piston I is pressed back by the maximum fluid-pressure in the chamber L the trigger $r$ will yield as the head $g^2$ on the stem passes down, thereby allowing the head to pass. When the maximum fluid-pressure is transmitted from the compressing apparatus on the locomotive to release the brakes, the pistons, valve H, and stem are forced up; but their upward movement now would ordinarily be tardy, because of the resistance of the air-cushion, and hence the brake now would be released slowly. This tardy release of the brake is a difficulty also sometimes experienced in the Westinghouse automatic brake on account of the resistance of the air in the auxiliary reservoir. To remedy this, therefore, when the stem starts on its upward movement the head $g^2$ at once comes in contact with the trigger $r$, which, not yielding, causes one arm, $p$, of the lever to move laterally, thereby removing the valve N from its seat over the escape-port and instantly allowing the fluid-pressure in the chamber to exhaust. There being then no longer any resistance to the valve mechanism, it will move quickly, and the brakes will be released instantly.

To charge that part of the brake apparatus on the car with fluid-pressure, compressed air from the compressing apparatus is transmitted through the train-pipe to the valve mechanism and moves the shifting part G H I of the same one way and then passes through the open one-way passage to the air-reservoir. In charging, as here described, the circuitous and smaller passages or ports of the Westinghouse triple valve heretofore used are avoided. The fluid-pressure thus transmitted from the compressing apparatus coming against the pistons G and I forces them up, thereby causing the valve H to close the brake-cylinder passage C' and opening the port $j$, which allows the maximum fluid-pressure to enter the air-chamber L. The same pressure at the outset will therefore exist on both sides of the shifting part of the valve mechanism. Now, to apply the brakes the engineer, by slightly opening the cock $q$, reduces the pressure in the train-pipe below the maximum stored in the air-chamber, whereupon the effect of the air in the chamber L is to press pistons I G and valve H down, thus allowing the fluid-pressure in the reservoir $R^3$ to pass through the passages R' and C' into the brake-cylinder and apply the brakes.

It will be seen by the foregoing that the shifting part G H I of the valve mechanism is moved both ways by air-pressure.

When, through a lessening of the fluid-pressure by leakage, it is desired to replenish or recharge the brake-cylinder without either releasing the brakes or relaxing the grip of the shoes on the wheels, the engineer may manipulate the cock $q$ to transmit air from the train-pipe to the brake-cylinder, and also from the train-pipe to the air-reservoir, under a less pressure than that stored up in the air-chamber. By this means a constant supply of fluid-pressure is maintained in the air-reservoir on the car, and there is no longer need for a main air-reservoir on the locomotive, as heretofore.

In Fig. 3 the open one-way passage D and check-valve $d$ are shown through the piston G, instead of entirely at one side, as in Fig. 2. The case A, drip-chamber B, and air-chamber L are here shown united in a single casting, instead of being composed of three pieces, as in Fig. 2. A cap, $A^3$, is bolted over and constitutes the top of the air-cushion chamber. As shown in this figure, the device can be more cheaply constructed.

As already explained, the form, and to some extent the arrangement, of the valves, ports, and passages may be varied or changed without materially affecting the operation of the parts herein combined, and I hereby include such modifications as within the scope of my invention.

While the several parts and features of my invention are adapted and especially designed for use without reference to and independent of a main air-reservoir on the locomotive, and are so shown here, said features may, nevertheless, be used with all their resulting advantages unimpaired in connection with a main air-storage reservoir on the locomotive, as now employed by the Westinghouse system of automatic brakes; therefore my claims hereinafter given apply to and cover said features in both said systems. In the event of the accidental separation of the cars of a train the brakes will at once be applied, as in the automatic brake system.

By my improvements very important results are attained, to wit: A brake is provided which affords the principal advantages of the automatic system, as well as the principal advantages of the "direct" compressed-air system, without the disadvantages or difficulties heretofore experienced in either.

A passage whereby compressed air may be transmitted from the train-pipe to the brake-cylinder enables the desired pressure to be there maintained notwithstanding the existence of leakage therein while the car is passing down a long grade. As this passage is employed in combination with valve mechanism whose shifting parts, to open and close communication between the reservoir and brake-cylinder, are moved both ways by air-pressure, it is possible by simply discharging the air which is pressing one way to remove resistance from said shifting parts when a quick movement thereof is desired. Obviously this cannot be accomplished where a spring is used to move the said shifting parts one way. I therefore disclaim any combination wherein the shifting parts of the valve which controls communication between the reservoir and brake-cylinder are moved one way by a spring.

Having described my invention, I claim and desire to secure by Letters Patent of the United States—

1. In a fluid-pressure brake, the combination of a single line of train-pipe, an air-reservoir on the car, a brake-cylinder, a valve moved both ways by air-pressure to open and close communication between the said reservoir and brake-cylinder, and a passage from the train-pipe to the same end of the brake-cylinder which communicates with the air-reservoir, which passage is opened and closed by varying the pressure in the train-pipe.

2. In a fluid-pressure brake, the combination of a single line of train-pipe, an air-reservoir on the car, a brake-cylinder, a valve moved both ways by air-pressure to open and close communication between the said reservoir and brake-cylinder, a passage through which air passes from the train-pipe to the brake-cylinder, and a check-valve which allows air to pass one way only in said passage.

3. In a fluid-pressure brake, the combination of an air-compressing apparatus, a single line of train-pipe, a cock to control the compressed air in the train-pipe, an air-reservoir on the car, a brake-cylinder, a valve moved both ways by air-pressure to open and close communication between the said reservoir and brake-cylinder, a passage through which air passes from the train-pipe to the brake-cylinder, and a check-valve which allows air to pass one way only in said passage.

4. In a fluid-pressure brake, the combination of a single line of train-pipe, an air-reservoir on the car, a brake-cylinder, a valve-casing provided with a passage to admit air from the train-pipe to the same end of the brake-cylinder which communicates with the air-reservoir, which passage is opened and closed by varying the pressure in the train-pipe, and a valve moved both ways by air-pressure to open and close communication between the said reservoir and cylinder.

5. In a fluid-pressure brake, the combination of the single line of train-pipe a brake-cylinder, an air-reservoir on the car, valve mechanism to open and close connection between said cylinder and reservoir, a chamber for air to resist the movement one way of the shifting parts of the valve mechanism, and an exhaust-valve separate from the shifting parts of said valve mechanism which discharges the resisting air.

6. In a fluid-pressure brake, the combination of the single line of train-pipe, an air-reservoir on the car, a brake-cylinder, a valve moved both ways by air-pressure to open and close communication between the said reservoir and brake-cylinder, a chamber for air to resist the movement one way of the shifting parts of the valve mechanism, and a passage which opens one way only to allow fluid-pressure from the train-pipe to enter the brake-cylinder while the brakes are applied, as set forth.

7. In a fluid-pressure brake, the combination of a brake-cylinder, an air-reservoir on the car, valve mechanism to open and close connection between the said cylinder and reservoir, a chamber for air to resist the movement of the shifting parts of the valve mechanism in that direction which the air-pressure in the train-pipe would force them, air-compressing apparatus on the locomotive, and a single line of train-pipe to connect directly between the air-compressing apparatus and the said appliances on the car, whereby the usual main air-reservoir on or near the locomotive is dispensed with, as set forth.

8. In fluid-pressure brakes, the combination of the single line of train-pipe, the brake-applying devices on the car, valve mechanism which opens and closes communication with the brake-applying devices, and an exhaust-valve to discharge air that is in immediate resistance to the shifting parts of said valve mechanism, whereby the movement of the latter is quickened.

In testimony whereof I affix my signature in the presence of two witnesses.

GEORGE A. BOYDEN.

Witnesses:

JOHN E. MORRIS,

ROBERT L. CLEMMITT.